STABILIZING FEEDBACK CIRCUIT FOR A CURRENT PULSE GENERATOR

Filed Dec. 21, 1962 4 Sheets-Sheet 1

INVENTOR
P. A. HARDING
BY *Charles Scott Phelan*
ATTORNEY

FIG. 4
| AUX. CURRENT DRIVER TRANS. STATES | | | READ LOAD CURRENT IN AMPS. |
|---|---|---|---|
| T63 | T66 | T67 | |
| ON | ON | ON | .271 |
| ON | ON | OFF | .268 |
| ON | OFF | ON | .265 |
| ON | OFF | OFF | .262 |
| OFF | ON | ON | .259 |
| OFF | ON | OFF | .256 |
| OFF | OFF | ON | .253 |
| OFF | OFF | OFF | .250 |
TYPICAL NOMINAL DRIVE (← .262)
FIG. 5
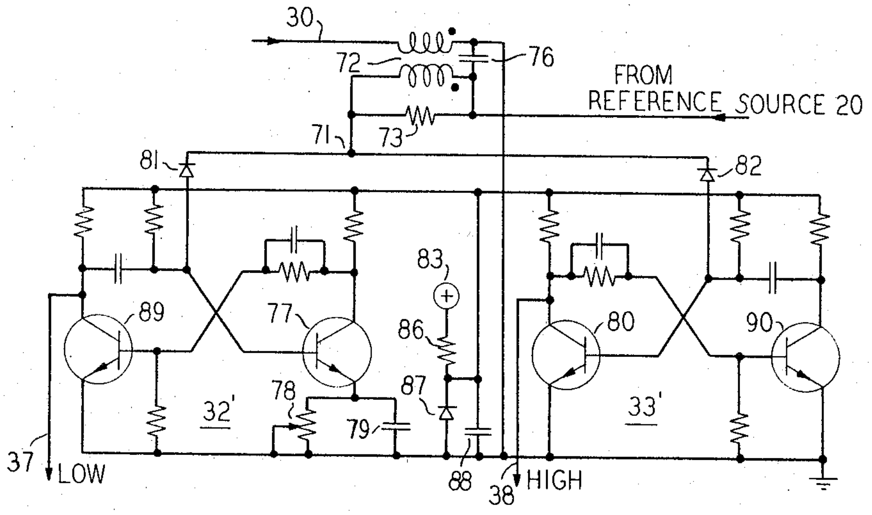
FIG. 5A
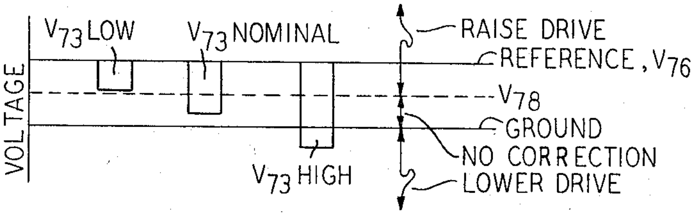

3,299,278

STABILIZING FEEDBACK CIRCUIT FOR A CURRENT PULSE GENERATOR

Philip A. Harding, Middletown, N.J., assignor to Bell Telephone Laboratories, Incorporated, New York, N.Y., a corporation of New York Filed Dec. 21, 1962, Ser. No. 246,505
11 Claims. (Cl. 307—88)

This invention relates to a current driver stabilizing circuit and, more particularly, it relates to such a circuit for a current driver that is used in connection with magnetic memory systems.

There are numerous occasions in the electric circuit arts when it is necessary to stabilize the amplitude of an electric current. One such application is in the drive circuits for coincident current, random access, magnetic memories of the type which may be used for temporary information storage in the electronic switching systems of a telephone central office. Typical coincident current core type memories must maintain tolerances on the current pulse drives in the order of five percent or less. Because of well known characteristics of the magnetic materials, the performance of ferrite sheet memories used in temporary storage applications has been found to be marginal with limits of five percent on the drive current magnitudes. However, by tightening the tolerances on the drive currents the memory performance was improved sharply. The principal circuit elements which cause drive current to vary with time and temperature are the resistors, diodes, capacitors, and transistors. Unless very expensive circuit components are employed it is difficult to reduce the drive current pulse amplitude tolerances to levels which are the same as or less than the individual circuit component tolerances.

Ordinary feedback amplifier schemes can be employed in some circumstances, however in such cases the feedback cannot be effective on all parts of the current waveshape unless the circuit is operated as a class A amplifier. The power dissipation of class A amplifier circuits is prohibitive when considered in many electronic switching systems. Furthermore, the phase delay in the feedback loop of a class A amplifier used in a magnetic memory system is also prohibitive. It is necessary that such loop incorporate the magnetic memory which is being driven, as well as the access circuits thereto, and the current generator itself. The phase delay through these circuits is usually sufficient to cause oscillations in the feedback loop. In addition, the amount of the delay is so variable that it is uncertain from one time to the next just exactly when the feedback compensation initiated by a particular drive current variation will appear back at the current driver input. Accordingly, ordinary feedback amplifier techniques would be hard put to provide accurate and reliable compensation during the drive current pulse rise time, for example, which is an extremely critical time in high speed magnetic memories. Also, the ordinary feedback amplifier schemes utilize capacitors, resistors, and transistors in the feedback loop; and the loop is, therefore, subject to the same large circuit component tolerances which characterize the current driver circuit that is to be compensated.

Apart from the power dissipation, delay, and circuit component tolerance difficulties of ordinary feedback schemes, there is still another difficulty that is normally encountered in prior art circuits which are directed to the problem of stabilizing the amplitude of current pulses. This difficulty involves the use in such stabilizing circuits of capacitive integrating means for storing a voltage magnitude which controls the amount of any corrective signal that is applied to the current source. The output pulse repetition rate of a current pulse generator that is to be used to drive a random access magnetic memory may vary widely in accordance with the dictates of the system in which it is used. Such rate variations will naturally have a substantial effect upon the amount of signal that is retained by the capacitive integrating circuit. Under these circumstances one can never be certain that the compensating signal applied to the pulse generator is indeed the result of a variation in the output amplitude of that generator and not the result of a variation in the pulse repetition frequency only.

It is therefore one object of the invention to stabilize the output of a current pulse source.

Another object is to stabilize the amplitude of current pulses by means which are not sensitive to the pulse repetition rate.

A further object of the invention is to utilize a single feedback circuit for injecting amplitude compensation in the output of a current pulse source to compensate that amplitude for a plurality of source-output-disturbing factors.

A further object is to have the output amplitude of a memory drive pulse generator automatically adjusted to compensate for variations in the operation of the memory output discriminator circuit.

Still another object is to compensate the output pulse amplitude of a current pulse source for a plurality of factors and in a manner which is both economical and reliable.

These and other objects of the invention are realized in an illustrative embodiment thereof which is herein described for purposes of illustration in connection with a magnetic memory system.

A current pulse stabilization circuit in accordance with the invention is provided for adjusting the drive current pulses of a ferrite sheet memory to maintain substantially constant binary ONE and ZERO output signal amplitudes from the memory. An auxiliary ferrite sheet is coupled to the memory drive current loop to be switched back and forth between its two stable states during each read-write cycle of the memory. Output signals from this sheet are compared to a reference voltage and the resulting error signal is utilized to control the direction of operation of a reversible binary counter. Output signals from that counter are utilized to change the drive current amplitude in an appropriate direction for reducing the error signal magnitude.

It is one feature of the invention that current drivers for magnetic memory circuits are stabilized by adding to the driver circuits a feedback path which includes a nonlinear translating element. The latter element amplifies the percentage of drive current variation so that amplified percentage variations in signal are thereafter utilized in the feedback path to produce amplitude compensation of the driver output.

It is another feature of the invention that the current driver circuit which is to be compensated drives its own memory load circuit as well as its compensating feedback circuit.

An additional feature is that a compensating feedback circuit for a current driver advantageously includes the same type of nonlinear circuit elements that are included in the main driver load so that aging, environment, and other factors which affect the character of the load also affect the operation of the feedback circuit in a manner which produces a driver current compensation of appropriate polarity and magnitude.

In accordance with still another feature of the invention a current driver that operates a bistable magnetic switching element array, wherein the effects of many factors are evidenced by changes in switching element output signal amplitude, has a driver feedback circuit which includes similar switching elements to produce a drive current amplitude change of appropriate magnitude and polarity to compensate for the change in output signal amplitude regardless of the causal factor.

It is a further feature that feedback signals produced for the purpose of stabilizing drive current pulse amplitude are digitally, rather than capacitively, integrated so that feedback compensation is independent of drive pulse repetition rate.

An additional feature of the invention becomes apparent in memory systems wherein memory output sensing circuits include amplitude discriminating means which compare each sensed output pulse to a predetermined reference voltage. In such systems the memory current driver feedback of the present invention employs a feedback signal discriminator which operates from the same reference voltage source to indicate the nature of the feedback signal. Thus, any changes in output level of that reference voltage source which affect the sensing discriminator operation also affect the feedback discriminator operation and produce a corresponding correction of the drive current amplitude.

A more complete understanding of the invention may be obtained from a consideration of the following detailed description of one embodiment thereof in connection with the appended claims and the attached drawings in which:

FIG. 4 is a table illustrating the operation of the circuit of FIG. 3;

FIG. 5 is a schematic diagram of a regenerative detector of the type used in FIG. 1;

FIG. 5A is a voltage magnitude diagram illustrating a phase of the operation of the invention.

Figure 1:
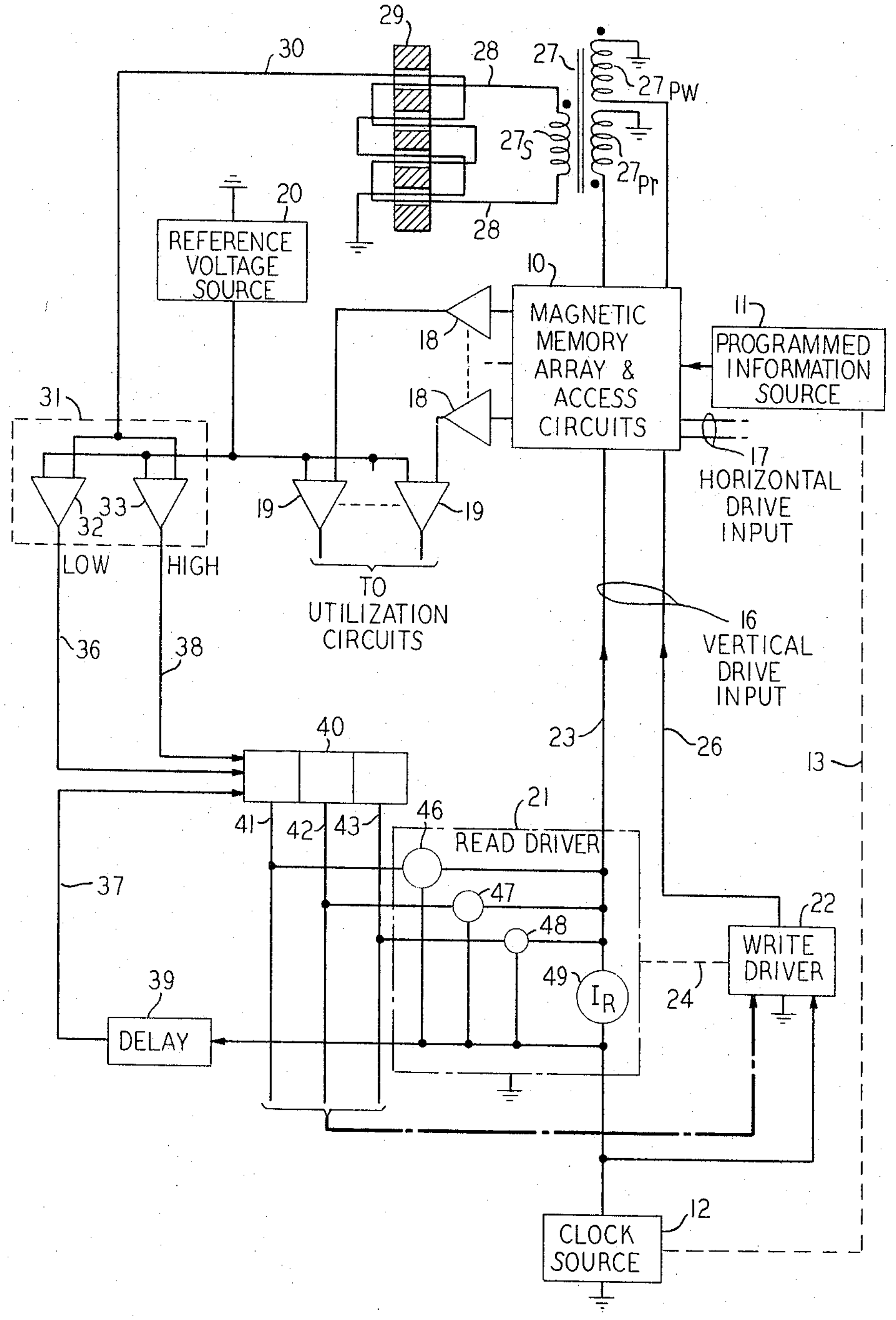
FIG. 1 is a diagram partially in schematic form and partially in block and line diagram form of a simplified magnetic memory system utilizing the present invention.

In FIG. 1 the magnetic memory array and access circuits 10 are supplied with programmed information from a source 11 which operates in synchronism with clock signals from a clock source 12 as indicated schematically by the broken line 13 interconnecting the sources 11 and 12. As described in the United States Patent 3,205,481 of C. G. Corbella, P. A. Harding, and E. H. Siegel, Jr., the program signals may operate switching devices included in the circuits 10 for selecting a particular bistable magnetic storage element for operation by drive current pulses which are supplied under the control of signals from clock source 12. The storage elements are arranged in a matrix array and are operated in their bistable mode to store binary coded information in the form ONE and ZERO signals of different amplitudes. A pair 16 of circuits in FIG. 1 supply read and write current pulses to elements of memory circuits 10 which are included in different column groups of the matrix array thereof. It is the means producing and regulating this type of current pulses which are the subject of the present invention. Similarly, the pair 17 of input circuits supply read and write current pulses to the row groups of the matrix array comprising the memory circuits 10 from a stabilized current driver which is not shown but is similar to the one described herein. Output signals from the memory are applied by sensing amplifiers 18, only two of which are illustrated, and thereafter are applied to corresponding regenerative detector circuits 19. The latter circuits compare the output signals in each sensing circuit with a predetermined reference voltage from a reference voltage source 20 and produce a detector output signal which indicates to appropriate utilization circuits whether the signal in the corresponding sensing circuit was a binary ONE or a binary ZERO.

Considering the vertical drive circuit pair 16, the read and write circuits thereof are essentially the same and both are utilized to drive a common feedback circuit in accordance with the present invention in a manner which will be described. Clock source 12 supplies signals which control the operation of a read current driver 21 and a write current driver 22 in alternation. These two drivers supply signals on leads 23 and 26, respectively, in the circuit pair 16, to the memory circuits 10 and to the primary windings of a feedback coupling transformer 27.

Drivers 21 and 22 are advantageously arranged to cooperate with one another for pulse amplitude tracking as schematically indicated by the broken line 24 therebetween and as shown in detail in the copending application Serial No. 241,684, filed December 3, 1962, in the names of P. A. Harding and E. H. Siegel, Jr., and entitled "Current Drive Circuit."

Figure 3:
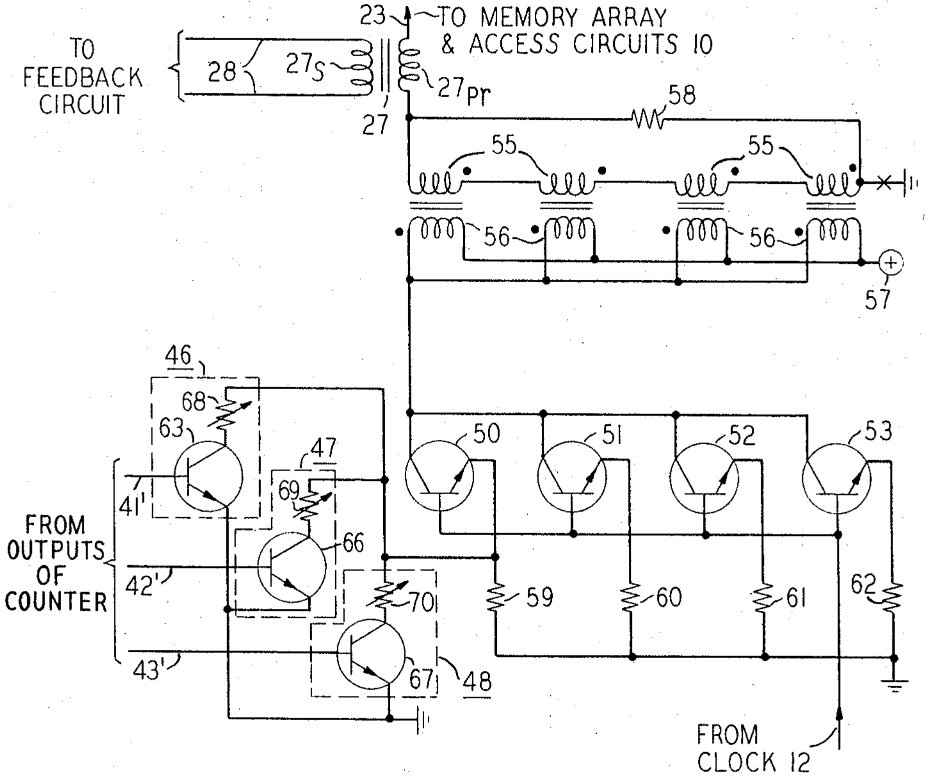
FIG. 3 is a schematic diagram of a current driver including means for varying the output signal amplitude thereof.

The primary windings of transformer 27 are designated 27*pr* and 27*pw*, respectively, and are included in read and write current loops with their respective driver circuits. Ground connections are shown on the windings 27*pr* and 27*pw* to complete a circuit loop with ground connections on their respective drivers 21 and 22. The particular locations of windings 27*pr* and 27*pw* within their respective current loops is not critical, and one variation is shown in FIG. 3.

A secondary winding 27*s* of transformer 27 is connected across the ends of a drive lead 28 which links the apertures of a ferrite sheet 29 having bistable magnetic characteristics similar to the characteristics of storage elements in memory array and access circuits 10.

For purposes of illustration, it is assumed that sheet 29 is a ferrite material and has a plurality of apertures therein. The material is so treated that it displays at each aperture the substantially rectangular hysteresis characteristic of a single bistable magnetic core. Thus, the material defining each aperture comprises an independent magnetic storage element which may be driven back and forth between its two stable states of remanent magnetic flux by the application thereto of appropriate magnetomotive forces. It is assumed in this specific embodiment that the magnetic memory and access circuits 10 are made up of arrays of similar ferrite sheets.

In systems wherein the magnetic circuits 10 comprise a coincident current memory, it is well known that each of two coincident drive currents is assigned an amplitude of approximately one-half the total amplitude required to accomplish switching of a bistable magnetic element in the memory. Source 12 causes drivers 21 and 22 to produce half-amplitude pulses in alternation. The feedback circuit of the present invention receives only one of the two coincident memory selection currents at a time. Accordingly, transformer 27 is arranged to provide a step-up in current amplitude by a factor of two so that each read pulse coupled through transformer 27 to the circuit 28 is of sufficient amplitude to accomplish the switching of a magnetic element of the type in the circuits 10. Similiarly, each write current pulse coupled to circuit 28 is of sufficient amplitude to switch such an element back to its original state. Accordingly, each pulse in circuit 28 is of sufficient amplitude to switch sheet 29.

A cross section view of sheet 29 is shown in FIG. 1, and only four apertures of the sheet are visible. In actual embodiments of the invention, however, sheets with many more apertures, e.g., 32 or more, linked by circuit 28 have been employed. The larger the number of apertures that are linked by circuit 28 the better is the averaging in output signal variations produced at the different aperture locations in the sheet 29. Such signal variations may result from factors such as differences in aperture size within the sheet and nonuniformities in the sheet composition. A sensing circuit 30 also links the same apertures of sheet 29 which are linked by the circuit 28 and in such a direction with respect to the circuit 28 that the switching of the material in sheet 29 around the various apertures linked by circuit 30 induces in the circuit 30 series-aiding potential differences. The sum of these potentials is applied via circuit 30 to the input of a regenerative amplitude detector, or discriminator, circuit 31.

The function of the ferrite sheet 29 in the feedback circuit of the invention is to amplify the percentage of drive current pulse amplitude variations. This function may be illustrated by reference to FIG. 2 which shows a typical illustrative translating characteristic for one ferrite sheet 29 which was employed in the circuit of the invention. In this figure, the peak sense voltage in millivolts in circuit 30 is plotted against the read current in milliamperes of circuit 28. A similar characteristic could be drawn for write drive current, but both drive current and sensed voltage would be of opposite polarity from that shown in FIG. 2. It can be seen from FIG. 2 that the peak sensing voltage is a function of the read current and this function may be expressed as follows:

$$S=f(I) \tag{1}$$

Figure 2:
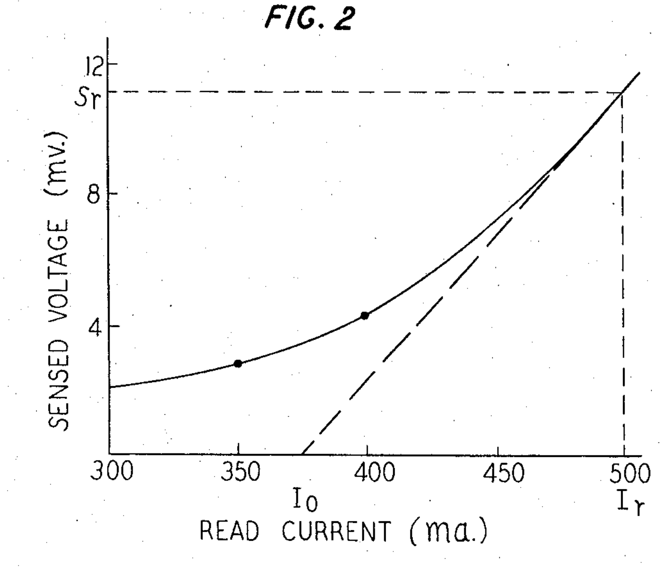
FIG. 2 is a diagram of the translating characteristic of an exemplary nonlinear element used in the feedback circuit of the invention.

If an incremental change is made in the read drive current, this produces a corresponding incremental change in the peak sensing voltage. The relationship between these changes follows from Equation 1 as:

$$dS=f'(I)dI \tag{2}$$

wherein $f'(I)$ is the slope of the curve in FIG. 2 expressed as the first derivative of the function of I at some selected value of the read drive current. If the selected value of read drive current is $I=I_r$, the slope of a tangent to the curve of FIG. 2 at $I_r$ may be expressed as $S_r/I_r-I_0$; and $$f'(I)=\frac{S_r}{I_r-I_0} \tag{3}$$

wherein $I_0$ is the abscissa intercept of the aforementioned tangent. Now substituting Equation 3 into Equation 2 for the case $I=I_r$:

$$dS_r=\frac{S_r}{I_r-I_0}dI_r \tag{4}$$

From this it follows that:

$$\frac{100dS_r}{S_r}=\frac{I_r}{I_r-I_0}\,\frac{100dI_r}{I_r} \tag{5}$$

Since $dS_r$ and $dI_r$ represent incremental changes in the peak sensed voltage and the read drive current, respectively, the expressions $100dS_r/S_r$ and $100dI_r/I_r$ represent the percentage changes in those quantities. Furthermore, the expression $I_r/I_r-I_0$ represents the factor by which the percentage change in sensed voltage is larger than the percentage change in read drive current.

Referring now to the specific numerical illustration in FIG. 2, the factor $I_r/I_r-I_0$ is found to be equal to four. In other words, the specific sheet 29 from which the characteristic of FIG. 2 was plotted steps up the percentage changes in read drive current by a factor of four in the feedback circuit of the invention. Thus, for example, a two percent change in read drive current would appear as an eight percent change in the sense voltage in circuit 30, and percentage changes of the latter magnitude can be readily and accurately handled by ordinary stock circuit components which normally have manufacturing and environmental tolerances of about five percent.

Voltages in sensing circuit 30 of FIG. 1 are applied to the input of the aforementioned regenerative amplitude detector 31 as negative-going pulses during read intervals, and positive-going pulses during write intervals, along with a positive reference voltage from the source 20. The details of detector 31 will be hereinafter described in connection with FIG. 5. However, it may be noted in summary here that the detector includes two regenerative circuits 32 and 33, each of which receives an input from sensing circuit 30 and an input from reference voltage source 20. These regenerative circuits are so arranged that sensing circuit voltage peaks which are within a predetermined narrow range will cause circuit 32 to be triggered and circuit 33 to remain in a quiescent condition. This is considered the normal null, or no-error, signal condition. Under these conditions, the output of regenerative circuit 32 on LOW lead 36 is dropped from a positive level to ground and applied to one input of a reversible binary counter 40 that is shown in detail in FIGS. 6 and 7. The output on HIGH lead 38 of the untriggered regenerative circuit 33 is normally at ground and is applied directly to another input of counter 40.

When the sensing voltage in circuit 30 falls below the lower limit of the aforementioned nominal range, an error is indicated in drive current magnitude. Neither of the two regenerative circuits 32 and 33 can be triggered, and the LOW input to counter 40 is positive while the HIGH input is at ground. If the sensing voltage is larger than the reference voltage, both regenerative circuits 32 and 33 are triggered to make the LOW lead ground and the HIGH lead positive. FIG. 5A is a diagram, which will be subsequently discussed, wherein the low, normal, and high negative-going read pulses in circuit 30 are superimposed upon the reference voltage to show the voltage relationships just described.

A third input for counter 40 in FIG. 1 is provided, during the read interval of each memory cycle, from the output of clock source 12 via a fixed delay circuit 39 and a lead 37. The delay of circuit 39 is added to assure that the clock signal will be applied to the counter at an appropriate time which accounts for drive current delays encountered in driver 21, magnetic circuits 10, transformer 27, and other circuit elements. Under the combined control of clock pulses on lead 37 and output signals from detector 31, counter 40 responds to low, normal, and high pulses in circuit 30 by advancing, remaining at a standstill, and receding, respectively. The operation of counter 40 controls the output voltage conditions on the output leads 41, 42, and 43 thereof.

The aforementioned output circuits of counter 40 are connected to auxiliary current drivers 46, 47, and 48, each of which is shown in the drawing as shunting a main current source 49 in read driver 21. This schematic representation of the contents of read driver 21 indicates that the read current is primarily supplied by the source 49 but may be increased or decreased by the operation of the auxiliary current drivers 46, 47, and 48. Details of read current driver 21 will be hereinafter discussed in connection with FIGS. 3 and 4 to show the manner in which these current adjustments are made. The three output connections from counter 40 are also applied to write driver 22, which is essentially the same as the read driver 21. Consequently, any change in the read current magnitude is accompanied by a corresponding and simultaneous change in the write current magnitude.

Summarizing now with respect to FIG. 1, the read and write currents for driving magnetic memory array and access circuits 10 are coupled to a ferrite sheet 29 for actuating that sheet back and forth between its two stable conditions of magnetic remanence during each read-write cycle of the magnetic memory circuits 10. The operation of sheet 29 steps up the percentage of variations in these drive current magnitudes to larger percentage variations in an output sensing voltage so that input current variations that would be too small to be accurately handled by stock circuit components in the feedback circuits are amplified to percentage variations which are well within the capabilities of such circuit components. These sense voltage variations are detected with respect to a reference voltage level to generate an error signal which indicates the magnitude relationship of the sense voltage with respect to the reference voltage. Logic circuits utilize the error signal output of the regenerative detector circuits to operate a reversible binary counter for digitally integrating the error signals. Counter output signals are utilized to adjust drive current magnitudes for nulling such error signals. A similar feedback arrangement, not shown, would of course also be applied to the horizontal drive input circuit pair 17 for compensating read and write currents in those circuits in a like manner.

The regenerative circuits 32 and 33 use the same reference voltage source as do the discriminators 19 for the sensing circuits of the magnetic memory circuit 10. Any reference voltage drift which would tend to produce ONE-ZERO bias in the outputs of discriminators 19 also affects the operation of discriminator 31 to initiate a compensating change in the output of the current drivers.

The reversible binary counter retains each corrective command from an error signal until a new command is received, and this action is completely independent of the drive pulse repetition rate.

It is well known that the information content of a random access magnetic memory is varied from time to time. Accordingly, the proportion of switched storage elements to shuttled storage elements changes from time to time, thereby changing the load on the current drivers and similarly changing the magnitude of the output from the current driver. However, in accordance with the present invention, the feed-back circuit senses these changes in the drive current as soon as they appear in a drive current pulse; and action is immediately initiated in the manner described to adjust the current driver so that in the next succeeding pulse the drive current variation will be reduced.

The effects of temperature and aging, which can produce well known changes in the output of magnetic devices such as those which are employed in memory circuits 10, are present also in connection with the ferrite sheet 29 and produce similar results upon signals in its output circuit 30 in the feedback circuit of the invention. Accordingly, when these effects do appear, the resulting changes in signals in sensing circuit 30 produce corresponding changes in the output of the current drivers 21 and 22 to offset those effects.

Corrections made by the feedback circuit of the invention are accomplished in a digital manner and do not, therefore, require class A feedback amplifiers. Consequently, oscillation suppression problems are considerably reduced and phase delay in the feedback loop is of relatively minor importance because it is of a character such that in a typical system the loop delay would be considerably less than the total read-write period of one cycle of memory operation. Accordingly, the designer may, by appropriately arranging his delay circuit 39, select the time during a cycle when he wishes to make his correction for that cycle, to be effective in the next succeeding cycle.

The circuits of FIG. 3 relate to a simplified current driver circuit of the type shown in the aforementioned application of P. A. Harding and E. H. Siegel, Jr. Also shown in FIG. 3 are the auxiliary current drivers 46, 47, and 48 that are controlled by counter signals from the counter output circuits 41, 42, and 43.

Signals from clock source 12 are coupled in parallel to the base electrodes of four transistors 50 through 53 to drive these transistors into conduction when it is desired to produce a read current drive pulse. The collector electrodes of the four transistors are likewise connected together and coupled through four parallel-connected driver transformer windings 56 to a source 57 of positive potential. Source 57 is schematically indicated by a circled plus sign which represents the indicated circuit connection to the positive terminal of a suitable source which has the negative terminal thereof connected to ground. Four secondary windings 55 are coupled to corresponding primary windings 56 and are connected in series-aiding relationship to develop a potential difference across a resistor 58 which is connected in series with transformer winding 27*pr*. Resistor 58 and winding 27*pr* are connected between ground and the read circuit lead 23. The transformer 27 is here coupled to the current driver output between the driver and the memory and access circuits 10. A number of other possible arrangements for the transformer in the feedback loop are, of course, possible.

Four resistors 59 through 62 connect the emitter electrodes of transistors 50 through 53 to ground and are assigned resistance values to fix the distribution of the current load among the four transistors. In an advantageous arrangement, these four resistors are substantially equal to one another to secure approximately equal distribution of the current load among the transistors. The effective value of resistor 59, however, is, according to the present invention, adjustable by means of the auxiliary drivers 46, 47, and 48. These three drivers include three transistors 63, 66, and 67 which have their base electrodes connected to the outputs of counter 40 by leads 41′, 42′, and 43′ and have their respective internal collector-emitter current paths connected in series with variable resistors 68, 69, and 70, respectively, so that each of the auxiliary current drivers shunts emitter-resistor 59. Transistors 63, 66, and 67 may be individually biased either ON for conduction or OFF to be nonconducting in accordance with the conditions of the corresponding three outputs of counter 40 in FIG. 1. Thus, by varying the conducting conditions of these three transistors, different amounts of shunting can be connected to resistor 59 for changing the effective external emitter circuit resistance of transistor 50. Additional variations in the shunting effects are obtained by adjusting resistors 68, 69, and 70 to different values.

FIG. 4 shows a table which compares eight possible permutations of conduction conditions of transistors 63, 66, and 67 with the typical read drive current outputs that were produced on lead 23 in one embodiment of the invention. In this case the read current varied from .250 ampere, with all three transistors 63, 66, and 67 OFF, to a value of .271 ampere, with all three transistors ON. The approximate intermediate nominal condition was .262 ampere of read current with transistor 63 ON and transistors 66 and 67 OFF. This nominal condition can be held by the operation of the three auxiliary drivers within a range of plus or minus three milliamperes in spite of four percent variations in the output of source 49. That plus or minus three milliampere range was found to produce entirely satisfactory operating results in that the magnetic memory array and access circuits 10 operated satisfactorily in an electronic switching system with an output signal error rate which was well within specification limits for the system.

Since the current driver output windings 55 are connected in series-aiding relationship, the current pulse amplitude in lead 23 is the average of the currents in the four transistors 50 through 53. It will be recalled in connection with FIG. 2 that the ferrite sheet 29 provided a step-up in percentage of signal variation by a factor of four. This step-up is stepped back down by a factor of four as a result of the aforementioned averaging action in the driver secondary windings 55.

As previously mentioned, FIG. 5 is a schematic diagram of the discriminator circuit 31 which includes two regenerative pulse amplitude detectors 32 and 33. These regenerative circuits 32 and 33 are utilized together in the manner previously described to make up the detector 31; but one such regenerative type of circuit, with input adapted for bipolar signal response in a manner known in the art, is used for each of the regenerative detectors 19 for the sensing circuits of magnetic memory and access circuits 10.

The object of the discriminator 31 is to indicate predetermined minimum variations from a nominal voltage amplitude level which is set by the voltage source 20 in FIG. 1. In order to accomplish this objective two monostable multivibrator circuits 32′ and 33′ are connected to receive at a common input junction 71 the signals from the sensing circuit 30 and the reference voltage from source 20. A transformer 72 couples negative-going read signals from lead 30 to develop across a resistor 73 a potential difference which tends to make junction 71 negative with respect to ground. Since resistor 73 is connected in series with a capacitor 76 between junction 71 and ground, the positive output voltage from reference source 20 maintains a charge voltage on capacitor 76 which opposes the pulse potentials across resistor 73. Accordingly, the polarity with respect to ground of the potential at junction 71 is a function of the relative magnitudes of the voltage V76 appearing across capacitor 76 and the pulse voltages V73 appearing across resistor 73 as illustrated in FIG. 5A.

Multivibrators 32′ and 33′ are essentially the same in all respects except that the emitter electrode of a transistor 77 in multivibrator 32′ is connected to ground through the parallel-connected combination of a rheostat 78 and a bypass capacitor 79. The emitter electrode of a corresponding transistor 80 in multivibrator 33′ is connected directly to ground. The potentials at the emitter electrodes of transistors 77 and 80 define the breadth of the feedback signal range in which no drive current change is required. Transistors 77 and 80 are normally conducting in the absence of negative-going input signals coupled to their respective multivibrators 32′ and 33′ from common junction 71 by diodes 81 and 82. Operating potential is supplied to these multivibrators from a positive source 83 which has a resistor 86 and a diode 87 connected in series between its positive terminal and ground. A bypass capacitor 88 shunts diode 87, and the common terminal between resistor 86 and diode 87 is connected to the multivibrators. Two additional transistors 89 and 90, in multivibrators 32′ and 33′, are normally nonconducting in the absence of input signals. Consequently, their respective collector electrodes are at a positive potential. The detector output leads, HIGH (38) and LOW (37), are connected to the collector electrodes of transistors 80 and 89, respectively.

The nominal feedback voltage signal range in which no drive current correction is required is indicated in FIG. 5A as the range between ground and the voltage V78 across rheostat 78. It is assumed in FIG. 5A that voltage V78 also includes the base-emitter junction drop in transistor 77. If the negative-going potential developed across resistor 73 is insufficient to pull junction 71 into the aforementioned nominal voltage range, diodes 81 and 82 are reversely biased since diode 81 has at its anode the small positive potential developed across rheostat 78 and the base-emitter junction of transistor 77, and diode 82 has at its anode the positive potential developed across the base-emitter junction of conducting transistor 80. This is a first one of the three conditions which can be indicated by discriminator 31, and it is the condition wherein the LOW circuit is positive while the HIGH circuit is at ground to direct an increase in drive current magnitude.

Assume now that the sense circuit 30 applies to resistor 73 a pulse of sufficient amplitude to pull junction 71 into the predetermined nominal range. Junction 71 is then at a positive potential which is less than the base electrode voltage of transistor 77, and diode 81 begins to conduct; but diode 82 is still unable to conduct. Accordingly, the negative-going potential at junction 71 is coupled to the base electrode of transistor 77 and biases that transistor nonconducting. Transistor 89 is regeneratively driven into conduction, by the action of transistor 77, for a predetermined time interval in a manner well known in the art for monostable multivibrators. Transistor 89 clamps its collector electrode and the detector LOW output lead to ground. This is the second one of the three detector output conditions, and it directs counter 40 to make no drive current change.

To achieve the third output condition of detector 31, the sense pulse from circuit 30 must be of sufficient magnitude to draw junction 71 below the predetermined nominal voltage range, i.e., below ground. Under these conditions both of the diodes 81 and 82 are biased into conduction, thereby triggering their associated multivibrators 32′ and 33′. The LOW lead is then at ground and the HIGH lead is positively biased to direct a decrease in drive current.

Figure 6:
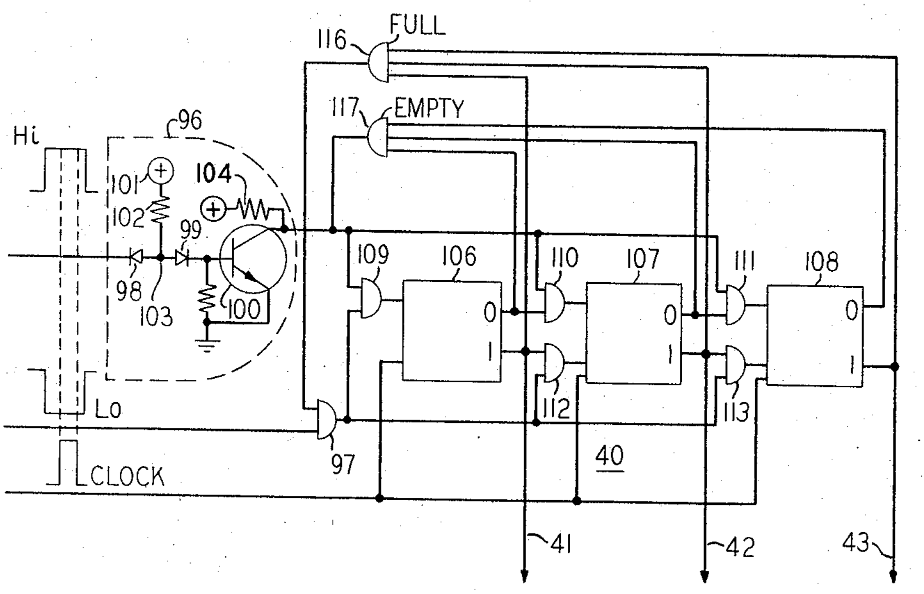
FIGS. 6 and 7 are schematic diagrams of logic circuits utilized in the feedback circuit of FIG. 1.

The circuit diagram of FIG. 6 represents the reversible binary counter 40 employed in the feedback stabilization circuit of FIG. 1. Counter 40 receives three input signals, two of these are the HIGH and LOW outputs, respectively, of detector 31; and the third is the delayed clock pulse which is received from delay circuit 39 in FIG. 1. Typical pulse configurations and time relationships are indicated by the wave diagrams associated with the three input leads in FIG. 6 for the case wherein the feedback signal on lead 30 in FIG. 1 is too large, i.e., both of the detectors 32 and 33 are triggered.

Each of the HIGH and LOW inputs in FIG. 6 is connected to an input of a different one of two logic gates 96 and 97, respectively. These gates are herein designated as AND-NOT gates because they produce a positive output when one or more of the input connections thereto is at ground potential, and they produce a ground output when all of the input connections are at a positive potential. The schematic diagram for a typical gate is shown inside the dotted representation of gate 96, and gate 97 illustrates the simplified schematic representation which is used for such gates throughout FIG. 6.

Within gate 96 a positive potential source 101 is connected by means of a resistor 102 to a common anode connection 103 of a pair of oppositely poled diodes 98 and 99. A positive input signal to gate 96 blocks diode 98 and permits conduction from source 101 through resistor 102 and diode 99 to the base electrode of a transistor 100. This action biases transistor 100 into conduction and clamps the gate output, i.e., the collector electrode of transistor 100, to ground. More than one diode 98 may be employed to couple plural input signals for gate 96 to the common anode connection 103. Thus, when any one input connection is at ground potential, the gate 96 is disabled, transistor 100 is biased nonconducting and the gate output connection stands at the positive potential fixed by a source 104. However, if all of the input connections to the gate are positive, the gate is enabled and its output lead is clamped to ground.

Counter 40 includes three bistable, or flip-flop, circuits 106, 107, and 108 interconnected by means of the aforementioned type of logic gates for reversible binary counting under the control of the three input signals. Details of a typical bistable circuit of the type mentioned will be discussed subsequently in connection with FIG. 7. Briefly, however, each bistable circuit has a plurality of input connections and ONE and ZERO output connections. In order to cause the bistable circuit to be triggered, one of the input connections must receive a negative-going input signal at a time when all of the input connections are simultaneously positively biased. The bistable circuits are arranged so that any time one of the input signals is negative-going, after all have been positive, the circuit must trigger regardless of which of its bistable conditions prevailed prior to the negative-going signal.

The output of gate 96 is connected to one input of each of three gates 109, 110, and 111, each of which is connected in an input of one of the bistable circuits 106 through 108, respectively. Similarly, the output of gate 97 is connected to another input of gate 109 and to an input connection of two additional gates 112 and 113 which have their outputs conected to input connections of bistable circuits 107 and 108, respectively.

The clock input lead is connected directly to an additional input of each of the bistable circuits 106, 107, and 108. Recalling the operation of the typical logic gate and the time relationships of the counter input signals, the reader will observe that bistable circuit 106 is triggered by the negative-going trailing edge of each clock pulse if gate 109 is disabled at the time of the occurrence of the clock pulse. Similarly, bistable circuit 107 is triggered by a clock pulse when gates 110 and 112 are disabled; and bistable circuit 108 is triggered by a clock pulse when gates 111 and 113 are disabled. The operation of each stage of counter 40, is thus, dependent upon clock pulses, the output of discriminator 31, and the condition of any preceding counter stage.

In order to prevent recycling of the counter during either the forward or the reverse phase of its operation, all of the counter stage ONE outputs are applied to the input of a FULL logic gate 116 to enable that gate when the counter has attained full count, and all of the ZERO outputs are arranged to enable an EMPTY gate 117 when the counter is at the zero count level. The output of gate 116 is connected to an input of gate 97 to disable that gate when the counter is full and thereby prevent forward counting. The output of gate 117 is applied to an input of each of the gates 109 through 111 for disabling those gates when the counter is empty to prevent reverse counting.

Since reversible binary counters are known in the art, it is not necessary to describe fully each phase of the operation of the counter 40. A few examples will indicate the nature of this operation with respect to the operation of the stabilizing feedback circuit in FIG. 1. When the HIGH input is in its normal ground condition and the LOW input is in its normal positive condition, the feedback signal is low and indicates a need to increase memory drive current. Gate 96 is disabled and applies an enabling input signal to each of the gates 109 through 111; and gate 97 is partially enabled. If it is assumed at this time that counter 40 is at an intermediate count level, the gates 116 and 117 are both disabled and have positive output connections. Gate 97 is then fully enabled. Consequently, the ground output from gate 97 disables gate 109 thereby applying a positive enabling input signal from the output of gate 109 to bistable circuit 106. The next clock pulse, after gate 109 is disabled, triggers bistable circuit 106.

Since the output of gate 97 also disables gates 112 and 113, bistable circuit 107 is triggered by the same clock pulse that triggered circuit 106 if bistable circuit 106 was at that time in the ONE condition so that gate 110 was disabled. Likewise, gate 108 is triggered by the same clock pulse if at the time of the clock pulse bistable circuit 107 was in the one condition so that gate 111 was disabled. If either of the gates 110 or 111 were enabled by a positive ZERO output from its preceding counter stage, its ground output connection would disable the corresponding following counter stage. This operation, wherein a binary counter stage can be triggered only when its preceding stage is in the binary ONE condition, represents forward counting and results in an increase in drive current as indicated in FIG. 4.

If the counter input signals include the normal ground signal on the HIGH lead and the triggered ground signal on the LOW lead, a feedback signal in the nominal range is indicated, and the counter 40 must be inhibited. Both of the gates 96 and 97 are disabled and their positive output signals enable gate 109. The ground output from gate 109 disables counter stage 106. The outputs of gates 96 and 97 also apply enabling signals to all of the gates 110 through 113. However, since at least one of the gates 110 and 112 in the inputs of the counter stage 107 must be enabled by its input connection from the preceding counter stage 106, the stage 107 is necessarily disabled. Similarly, at least one of the gates 111 and 113 must be enabled thereby disabling counter stage 108. Consequently, clock pulses received under these conditions are unable to trigger any stage of counter 40.

The third example of counter operation to be considered is that illustrated by the wave diagrams adjacent the input leads in FIG. 6 wherein the signal from sheet 29 in FIG. 1 is of sufficient magnitude to trigger both regenerative circuits in detector 31 thereby producing a positive output on the HIGH lead and a ground output on the LOW lead to call for a decrease in drive current. Under these conditions gate 96 is enabled, and its output disables gate 109 and the gates 110 and 111. Consequently, the outputs of these three gates 109 through 111 are positive and partially enable the counter stage input connections associated with each of them. However, the positive output from gate 97 partially enables each of the gates 112 and 113. Consequently, if either of the counter stages connected to the input of one of these latter two gates is in the ZERO condition, the counter stage following that gate is further enabled and can be triggered by the negative-going trailing edge of the clock pulse when it occurs. This operation corresponds to reverse binary counting and reduces the memory drive current in accordance with the operation described in connection with FIGS. 1, 3, and 4.

Output leads 41, 42, and 43 are taken from the ONE outputs of the three stages in binary counter 40 with lead 41 representing the least significant digit in the binary output representation and lead 43 representing the most significant digit. Thus, when counter 40 is empty, all stages are in the ZERO condition. Leads 41 through 43 are at ground potential, and the three transistors 63, 66, and 67 in the auxiliary current driver of FIG. 3 are biased OFF. Under these conditions transistor 50 in FIG. 3 has its maximum emitter circuit resistance, and the driver output current is at its minimum level. As the counter advances in the normal binary fashion, leads 41 through 43 receive positive signals to bias the transistors 63, 66, and 67 into conduction in the various permutations indicated in FIG. 4.

Figure 7:
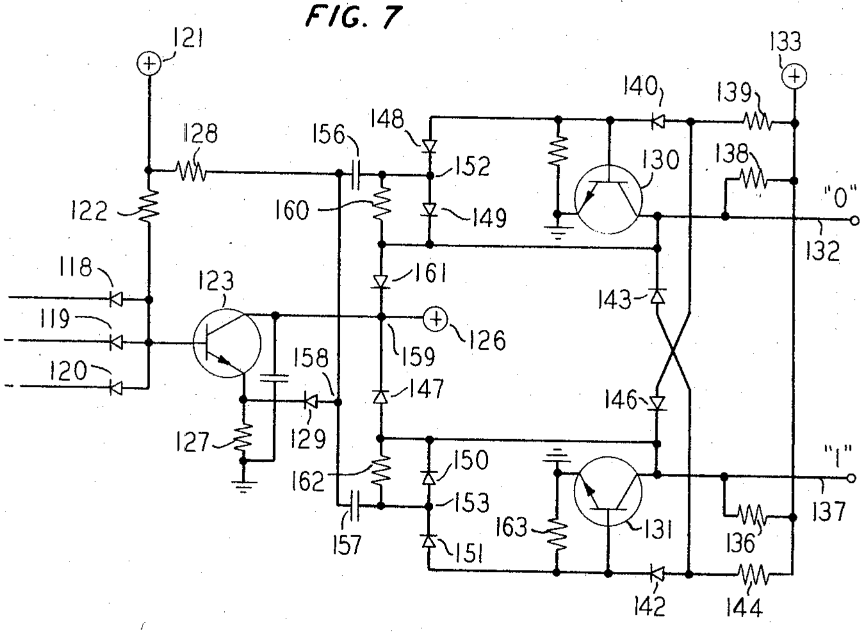

FIG. 7 illustrates the schematic diagram of a typical binary counter stage of the type employed in FIG. 6. Three input connections are shown with diodes 118, 119, and 120 therein. More or less input connections may be advantageously employed depending upon the number of logical functions which must control the bistable circuit. If any of the input connections is at ground, sufficient current may be drawn from a positive potential source 121 through a resistor 122 to prevent conduction by an N-P-N transistor 123, which is connected to one terminal of resistor 122 and all of the anodes of the diodes 118, 119, and 120. However, when all of the input connections are positively biased conduction in the aforementioned diodes is blocked and source 121 supplies sufficient current to the base electrode of transistor 123 to initiate conduction therein. Collector current for this purpose is supplied by a positive voltage source 126. A positive potential, approximately equal to that on the input diodes, is present at the emitter electrode of transistor 123 as a result of the aforementioned current flow through transistor 123 and its emitter resistor 127, and as a result of the current flow through the latter resistor and a resistor 128 and a diode 129 from the source 121.

Two additional transistors 130 and 131 are also included in the bistable circuit of FIG. 7, and it is initially assumed that transistor 130 is conducting and transistor 131 is in a nonconducting condition. Since the emitter electrode of transistor 130 is connected to ground, the ZERO output lead 132 of the bistable circuit is near ground. Similarly, positive potential from a source 133 is applied through a collector circuit resistor 136 to the ONE output terminal 137 and through diode 147 to positive source 126 thereby establishing the bistable circuit in the binary ONE condition with its ONE output connection positive and its ZERO output connection near ground. Source 126 is less positive than source 133 thus clamping lead 137 at approximately the potential of source 126. Source 133 also supplies operating current to transistor 130 through a collector circuit resistor 138. Current also flows from source 133 through a path including a resistor 139, a diode 140, and the base-emitter path of transistor 130 to ground. An additional path to ground for current from source 133 includes another resistor 141, a diode 143, and the collector-emitter circuit of transistor 130; and conduction in the latter path biases the base electrode of transistor 131 to a level which holds the transistor nonconducting.

Since transistor 131 is not conducting, its collector electrode is at a positive potential, and a diode 146 interconnecting that collector electrode and the base electrode of transistor 130 is reversely biased. Substantially no current flows through diodes 148 and 149 interconnecting the base and collector electrodes of transistor 130 at this time because of the heavy conduction through transistor 130 which holds the anode of diode 148 and the cathode of diode 149 at almost the same potential. Likewise, diodes 150 and 151 conduct little or no current because the anode of diode 151 is clamped at about ground potential, the same as the base of transistor 131, and the cathode of diode 150 is at the positive potential of the collector of transistor 131.

A junction 152 between diodes 148 and 149 is connected to a similar junction 153 between diodes 150 and 151 by two capacitors 156 and 157 and a circuit junction 158. Junction 152 is also connected by a resistor 160 and a diode 161 to the terminal 159 in the output of source 126. Junction 153 is similarly connected to source 126 by resistor 162 and the diode 147.

Under the previously assumed conditions with transistors 123 and 130 conducting; junction 158 is positively biased by the potential drop across resistor 127; junction 152 sees through resistor 160 and diode 149 in parallel the ground potential at the collector electrode of transistor 130. Capacitor 156 assumed a charge condition indicating that junction 158 is positive with respect to junction 152. Since diode 147 is conducting, junction 153 sees through resistor 162 the positive clamp potential, which is approximately equal to the potential at junction 158; and there is thus no substantial charge placed on capacitor 157. This, then, is the initial condition for the bistable circuit which must be satisfied, and the circuit is primed to be triggered.

If it is now assumed that one of the input signals to the bistable circuit is the positive-going clock pulse for the counter in FIG. 6, the negative-going trailing edge of that pulse biases diode 120 into conduction. This conduction diverts base current away from transistor 123, and biases that transistor nonconducting. The consequent reduction in emitter-electrode potential at transistor 123 is coupled back through junction 158 and capacitors 156 and 157 to the junctions 152 and 153 as a negative-going potential. That negative-going potential has no substantial effect upon the diode 150 which was not previously conducting, or upon the diode 151 which at that instant has the ground potential of the collector electrode of transistor 130 at its anode. However, the negative-going potential at junction 152, which was already at ground potential, draws diode 148 into conduction thereby withdrawing base current from transistor 130 and biasing that transistor nonconducting.

The reduced conduction of transistor 130 permits its collector electrode to become positively biased by source 133 through resistor 138 and thereby block conduction in diode 143. This permits the base electrode of transistor 131 to rise to a positive potential by virtue of conduction from source 133 through resistor 141, diode 142, and through its own base-emitter junction. Conduction in transistor 131 ultimately clamps both its collector and emitter electrodes to ground and permits diode 146 to conduct from source 133 through resistor 139 thereby adding a ground clamp to the base electrode of transistor 130 and holding that transistor in its nonconducting condition. Since transistor 130 is not conducting, the positive potential at its collector electrode blocks conduction through diode 143.

The bistable circuit of FIG. 7 now stands in its ZERO state with transistor 130 nonconducting and transistor 131 conducting. Lead 132 is positive and lead 137 is near ground. No further change in the conditions at output leads 132 and 137 can take place until the circuit is once more primed for triggering by a combination of three simultaneous positive input voltages which permit transistor 123 to conduct once more. The present primed condition is similar to that previously described for conduction in transistor 130, but inverted due to the symmetry of the circuit and conduction in transistor 131. Junction 158 is at about the same potential as junction 152 and at a more positive potential than junction 153. This time, the application of a ground input signal biases transistor 123 nonconducting as before; but the resulting negative-going potential change at junction 158 pulls junction 153 to a negative voltage. Diode 151 conducts and diverts enough base current away from transistor 131 to bias that transistor nonconducting and transfer conduction back to transistor 130 again. Now the bistable circuit is back in its ONE condition.

The reversible binary counter and its three bistable stages are advantageously employed in the present invention since it is possible, by means of the described logical function performed therein, to operate the counter either forward or reverse, or to remain at a standstill, as directed by the output signals of detector 31 and under the control of clock pulses from source 12 in FIG. 1. The combination of logic circuits renders the counter operation relatively free from the influence of noise voltages which are frequently most disturbing in complex memory systems of the type in which the invention may be employed. Furthermore, counter 40 does not lose any information stored therein if the clock signal frequency should vary.

Although the present invention has been described in terms of a particular application and an embodiment thereof, it is to be understood that additional applications, embodiments, modifications, and features which will be obvious to those skilled in the art are included within the spirit and scope of the invention.

What is claimed is:

1. A current pulse generating circuit comprising
a pulse generator circuit,
a magnetic load coupled in an electric loop circuit with said pulse generator,
magnetic means of the same type as said load and having input and output circuits,
means coupling said input circuit to said loop circuit for driving said magnetic means in response to pulses from said generator,
a reference voltage source,
means comparing signals in said output circuit with the output of said reference voltage source,
a reversible binary counter having input means connected to control the direction of operation of said counter in response to the output of said comparing means,
said counter having plural output connections on which output signals are produced as a function of a count condition of said counter, and
means coupling said counter output connections to said current pulse generator for altering the magnitude of output pulses therefrom to null the output of said comparing means.

2. A current pulse generator, a magnetic load coupled in an electric loop circuit with said pulse generator,
magnetic means of the same type as said load and having input and output circuits,
said magnetic means having a nonlinear translating ratio whereby significant percentage variations in signals in said input circuit are reproduced in said output circuit as variations of a greater percentage,
means coupling said input circuit to said loop circuit,
a source of reference potential,
means comparing signals in said output circuit with said reference potential to produce control signals indicating the amplitude relationship therebetween, and
means coupling said comparing means to said generator to adjust the magnitude of pulses from said generator in accordance with said control signals.

3. A current pulse generator,
a magnetic load coupled to an electric loop circuit with said pulse generator,
magnetic means of the same type as said load and having input and output circuits,
said magnetic means having a nonlinear translating ratio whereby significant percentage variations in signals in said input circuit are reproduced in said output circuit as variations of a greater percentage,
means coupling said input circuit to said loop circuit,
means coupling said output circuit to adjust the magnitude of pulses from said generator, and
said output circuit coupling means comprises digital means responsive to voltages outside of a predetermined voltage amplitude range to adjust the magnitude of said current pulses in a plurality of predermined steps in response to each output circuit pulse outside of said predetermined range.

4. A current stabilizing circuit comprising
a magnetic load of variable impedance and comprising a magnetic memory array for information bit storage and an output sensing circuit for said array,
a discriminator is connected to said array output circuit,
auxiliary magnetic means having an output circuit and having a magnetic characteristic which is similar to the magnetic characteristics of said load,
a current pulse source driving both said load and said auxiliary magnetic means,
means coupling said output circuit to said source for adjusting the source output to maintain the output of said auxiliary magnetic means substantially constant,
said coupling means includes another discriminator connected between said auxiliary magnetic means and said current pulse source, and
a common source of reference potential establishes the operating voltage levels of both of said discriminators.

5. A current pulse generator comprising
a source of pulses which are subject to pulse amplitude variations,
a feedback circuit coupled to the output of said source,
pulse amplitude discriminating means in said feedback circuit for producing output signals which indicate the amplitude of pulses in said feedback circuit with respect to a predetermined reference voltage level, said discriminating means including a voltage source for fixing said level,
nonreactive integrating means coupled to the output of said discriminating means, and
means coupling the output of said integrating means to said source for reducing said variations.

6. The pulse generator in accordance with claim 5 wherein said discriminating means comprises
two amplitude-sensitive trigger circuits connected to said reference voltage source and differently biased for triggering with respect to said reference voltage level,
means coupling pulses in said feedback circuit to the inputs of both said trigger circuits, and
means individually connecting the outputs of said trigger circuits to said integrating means.

7. The pulse generator in accordance with claim 6 wherein said integrating means comprises
a reversible binary counter having forward and reverse control input circuits connected to said trigger circuit outputs, and
means connecting the outputs of said reversible counter to said pulse source.

8. The pulse generator circuit in accordance with claim 5 in which said integrating means comprises
a reversible binary counter having forward and reverse control input connections,
means connecting said input connections to the output of said discriminating means, and
means connecting the output of said reversible counter to said source for reducing said variations.

9. The current pulse generator in accordance with claim 5 in which
a magnetic memory array is connected as a load for said pulse generator,
signal amplitude discriminating means are connected to the output of said array for indicating the amplitude of memory output signals with respect to a predetermined reference voltage level, and
means connect said voltage source to the last mentioned discriminating means to fix the reference level thereof.

10. A current pulse generator comprising a source of pulses which are subject to amplitude variations,
a reference potential source,
means coupled to the outputs of said pulse source and of said potential source for producing output signals which are a function of the polarity and magnitude of said variations with respect to the output of said potential source,
said pulse source including at least one transistor circuit connected in the common emitter configuration, a resistor connected in the emitter circuit of said transistor, a plurality of shunting resistors, a plurality of switches, and each of said switches being connected in series with a different one of said shunting resistors in a different series circuit shunting said emitter circuit resistor, and
means coupling said output signals to said switches for actuating said switches in different permutations for adjusting the amplitude of pulses from said source.

11. The pulse generator in accordance with claim 10 wherein said coupling means comprises
a reversible binary counter having a plurality of stages,
means connecting the output of each of said stages to control the opening and closing of a different one of said switches, and
said counter having forward and reverse control input connections connected to receive said output signals.

References Cited by the Examiner

UNITED STATES PATENTS

| | | | |
|---|---|---|---|
| 3,092,766 | 6/1963 | Hansen | 307—88.5 |
| 3,193,691 | 6/1965 | Akmenkalns | 307—88 |
| 3,207,919 | 9/1965 | Conklin | 307—88 X |
| 3,239,681 | 3/1966 | Bond | 307—88 |

BERNARD KONICK, *Primary Examiner.*

M. S. GITTES, *Assistant Examiner.*